(12) United States Patent
Filler (10) Patent No.: US 9,254,230 B2
(45) Date of Patent: Feb. 9, 2016

(54) GRIPPING TIRES FOR A WHEELCHAIR

(71) Applicant: L&C Verwaltungsgesellschaft mbH, Dresden (DE)

(72) Inventor: Mirko Filler, Dresden (DE)

(73) Assignee: L&C Verwaltungsgesellschaft mbH, Dresden (DE)

( * ) Notice: Subject to any disclaimer, the term of this patent is extended or adjusted under 35 U.S.C. 154(b) by 0 days.

(21) Appl. No.: 14/315,351

(22) Filed: Jun. 26, 2014

(65) Prior Publication Data

US 2015/0297428 A1    Oct. 22, 2015

(30) Foreign Application Priority Data

Apr. 17, 2014  (EP) .................................... 14165129

(51) Int. Cl.
*A61G 5/02* (2006.01)
*G01B 11/00* (2006.01)
*G01B 5/00* (2006.01)
*G01B 21/00* (2006.01)

(52) U.S. Cl.
CPC ................ *A61G 5/028* (2013.01); *A61G 5/022* (2013.01); *G01B 5/00* (2013.01); *G01B 5/0025* (2013.01); *G01B 11/00* (2013.01); *G01B 21/00* (2013.01)

(58) Field of Classification Search
CPC ......... A61G 5/028; A61G 5/022; G01B 5/00; G01B 5/0025; G01B 11/00; G01B 21/00
USPC ...................................................... 280/250.1
See application file for complete search history.

(56) References Cited

U.S. PATENT DOCUMENTS

| 2,281,359 | A | * | 4/1942 | Kenner | 152/209.8 |
| 3,435,874 | A | * | 4/1969 | Mirtain et al. | 152/209.8 |
| 3,554,259 | A | * | 1/1971 | Webb | 152/209.8 |
| 3,656,532 | A | * | 4/1972 | Roberts | 152/455 |
| 4,351,540 | A | * | 9/1982 | Minnebraker | 280/250.1 |
| 4,366,964 | A | * | 1/1983 | Farey et al. | 280/250.1 |
| 6,142,201 | A | * | 11/2000 | Harms | 152/209.8 |
| 6,758,928 | B2 | * | 7/2004 | Hubbell et al. | 156/110.1 |
| 7,156,407 | B2 | * | 1/2007 | Jahn | 280/250.1 |
| 2014/0062054 | A1 | * | 3/2014 | Schaaper | 280/250.1 |

FOREIGN PATENT DOCUMENTS

| DE | 20 2013 101 67 U1 | 6/2013 |
| FR | 2526311 A1 | 11/1983 |
| WO | 00/18346 A1 | 4/2000 |

* cited by examiner

*Primary Examiner* — Kevin Hurley
*Assistant Examiner* — Michael Stabley
(74) *Attorney, Agent, or Firm* — Michael Soderman (57) ABSTRACT

The gripping tire for a wheelchair as per the invention has a profile cross-section that is asymmetric and divided up in the radial and axial directions. Axial and radial refer here to the wheel of the wheelchair onto which the gripping tire is coaxially attached. A divided profile cross-section means that one of the sides of the axial division and the (inner) side of the radial division turned towards the axis of the gripping tire are designed to be bulbous, and the other side of the axial division and the (outer) side of the radial division turned away from the axis of the gripping tire are flattened. Furthermore, there is a process as per the invention for determining the value of at least one parameter of the cross-sectional profile of the gripping tire.

17 Claims, 7 Drawing Sheets

GRIPPING TIRES FOR A WHEELCHAIR

CROSS REFERENCE TO RELATED APPLICATIONS

This application claims the benefit under 35 USC 119 of European Application No. 14165129.9 filed on Apr. 17, 2014; this application is incorporated by reference herein in its entirety.

BACKGROUND

The invention relates to a gripping tire for a wheelchair.

Gripping tires are fastened to the wheels of wheelchairs in a coaxial and torsionally rigid fashion, and the user can grip them to rotate the wheels. In the simplest case, the gripping tires are made of aluminum extruded sections and connected to the rim of the wheelchair wheel.

A gripping tire is described in the document DE 10 2009 038 816 A1 that is comprised of at least one oval pipe and, in particular, at least two connected pipes. A cross-sectional profile of the gripping tire whose height is greater than its width is achieved in that way. A gripping tire of that type offers an improved gripping capability vis-a-vis customary pipe profiles. The increased production costs to connect several pipe profiles is a drawback.

A griping tire is proposed in WO 03/011202 A1 that is fully connected to the rim of the wheelchair wheel via a band. In addition to increased production expenses, there is a further drawback that only the gripping-wheel/rim unit can be replaced, which is labor and cost-intensive.

A gripping tire comprised of a pipe with an oval cross-section is described in JP 2000225151 A. The limited handiness of this solution is a drawback.

SUMMARY

The invention relates to a gripping tire for a wheelchair.

The gripping tire for a wheelchair as per the invention has a profile cross-section that is asymmetric and divided up in the radial and axial directions. Axial and radial refer here to the wheel of the wheelchair onto which the gripping tire is coaxially attached. A divided profile cross-section means that one of the sides of the axial division and the (inner) side of the radial division turned towards the axis of the gripping tire are designed to be bulbous, and the other side of the axial division and the (outer) side of the radial division turned away from the axis of the gripping tire are flattened. Furthermore, the bulbous and flattened areas smoothly merge into one another; outstanding haptics and ergonomics are advantageously achieved because of that. Furthermore, there is a process as per the invention for determining the value of at least one parameter of the cross-sectional profile of the gripping tire, wherein in a first step at least one parameter of the hand of a wheelchair user is determined and in a second step the value of at least one parameter of the cross-sectional profile of the gripping tire is determined from the value that is found for the at least one parameter of the hand of the wheelchair user.

DETAILED DESCRIPTION

The object of this invention is to present a gripping tire that has outstanding ergonomic characteristics, that can be used in a flexible way, that is economical to manufacture and that is very robust. Furthermore, an object of the invention is to provide a process via which the parameters of the gripping tire can be determined.

The gripping tire for a wheelchair as per the invention has a profile cross-section that is asymmetric and divided up in the radial and axial directions. Axial and radial refer here to the wheel of the wheelchair onto which the gripping tire is coaxially attached. A divided profile cross-section means that one of the sides of the axial division and the (inner) side of the radial division turned towards the axis of the gripping tire are designed to be bulbous, and the other side of the axial division and the (outer) side of the radial division turned away from the axis of the gripping tire are flattened. Furthermore, the bulbous and flattened areas smoothly merge into one another; outstanding haptics and ergonomics are advantageously achieved because of that.

Bulbous in the sense of this application means that at least 60%, preferably 75% and especially preferably 90% of the outer contour of the respective side has a radius between 2.5 mm and 20 mm.

Flattened in the sense of this application means that the radius is at least 20 mm.

The division into the axial or radial direction is done for the most part in the center with reference to the respective overall expansion.

As a special preference, the outer contour of one half of the outer side of the radial division (and thus of a quadrant of the cross-section profile) has two flattened areas that meet in a gripping edge at an angle of 80° to 100° and this meeting point of the flattened areas is rounded off with a radius of 2 mm to 15 mm. The gripping tire is especially well adapted to the ergonomics of the hand, advantageously, because of the gripping edge.

The inner side (turned towards the axis of the gripping tire) of the radial division is, moreover, preferably symmetric for the most part with reference to the axial division. The radius of this area is smallest at the vertex and is preferably between 2.5 mm and 12.5 mm there, and decreases in the direction of the outer areas (in the axial direction).

A profile is advantageously created so as to be very well adapted to the ergonomics of the hand when the gripping tires are used. The outer side of the radial division offers, with the flattening, a good support surface for the thumb of the user.

It is especially advantageous that the gripping tire can be mounted on the wheelchair wheel with either side, and thus with the bulbous side or with the flattened side directed towards the wheelchair wheel. The discovery was surprisingly made in experiments that around the same percentage of wheelchair users prefer that the bulbous side of the axial division is directed towards the wheelchair wheel vis-a-vis the case when this side is directed towards the outside. It is particularly advantageous that the desires of a large proportion of wheelchair users can consequently be fulfilled with a model of the gripping tire.

As a further preference, the gripping tire is designed in the form of a hollow profile. That is economical, as an advantage, and reduces the weight. Fiber-reinforced plastic (FRP) or aluminum is especially preferred as the material. The aluminum is preferably produced via the extrusion process in combination with the profile-binding process. The infusion process is preferably used for the production of the FRP. Dry fabric or braided tubes are first draped on a core for this. After the infusion and hardening of the matrix material in a mold, the core remains in the component (lost core) or is subsequently removed (removable or meltable core). As an alternative to the infusion process, hybrid tubes with matrix material that has already been integrated on a thermoplastic basis are used. The reinforcing fibers are completely coated here via the melting of the matrix material on them in the mold.

As a further preference, the hollow profile has fairly thick walls in the areas facing outwards when assembled. The stability can be significantly and advantageously increased in that way without a negative influence on the weight.

The inner side of the profile of the gripping tire can have reinforcement ribs along the circumference to further strengthen the gripping tires. These reinforcement ribs can also, in particular, only be arranged in sections of the area that faces outwards. The stability and robustness against jolts can be advantageously improved in that way with a moderate weight increase.

Furthermore, the gripping tires have means for attachment to the wheel of a wheelchair. They are preferably axially oriented lugs that are firmly bonded (via welding when metallic gripping tires are used) to the gripping tire. The lugs have holes on the end on the wheel side that make it possible to radially screw the tires to the wheelchair rim.

The geometric design of the gripping tire will be described in more detail below:

The side of the radial division turned towards the axis of the gripping tire is preferably an elliptical segment. The opposite side that is turned away from the axis of the gripping tire preferably has a straight piece. The straight piece and the elliptical segment are connected via a first connecting circle segment with a radius h and a second connecting circle segment with a radius i. The circumference of the cross-section profile is consequently formed by the elliptical segment, a connecting circle segment joined to that, a subsequent straight piece joined to that if necessary and a further connecting circle segment. The straight piece can also be formed by the direct transition of the two connecting circle segments.

The smaller radius of the two connecting circle segments h has a value between 2 mm≤h≤15 mm, and the radius of the other connecting circle segment i has a value of 10 mm≤i≤20 mm. The connecting circle segment with the smaller radius h corresponds to the gripping edge described above.

As a special preference, the elliptical segment is a segment of an ellipse with the main axes a and b. The longer main axis a with the radius of the gripping tire and the shorter main axis b with the axial direction of the gripping tire enclose an angle d between −25°≤d≤+25°.

As a further preference, the main axis a has a length of 20 mm≤a≤100 mm, 20 mm≤a≤60 mm as a special preference, and the main axis b has a length of 15 mm≤b≤50 mm, 15 mm≤b≤30 mm as a special preference. The length of the main axes here is understood to mean the diameter going through the center point of the ellipse along the respective main axis. The center point of the ellipse is on the axial parting line with a distance j from the straight piece in the direction of the center point of the gripping tire. The distance j is preferably 0≤j≤10 mm.

Likewise as a preference, the smallest diameter c of the elliptical segment is 5 mm≤c≤25 mm.

This smallest radius c is preferably in the inner section of the profile cross-section and the radial division line.

The straight piece is preferably tilted by an angle g of −15°≤g≤+15° vis-a-vis the radial division. As a further preference, it has a straight or slightly convex (with reference to the cross-sectional profile), curved contour with a radius of curvature f of at least 30 mm. The length e of the straight piece e is between 0 mm and 20 mm, preferably between 5 mm and 20 mm. When the straight piece has a length of 0 mm, it will exclusively be formed by the transition of the two connecting circle segments that create a flattened area.

As a special preference, the radius h of the first connecting circle segment is between 2 mm≤h≤15 mm and the radius i of the second connecting circle segment is between 10 mm≤i≤20 mm.

The cross-sectional profile of the gripping tire is preferably completely convex. In another preferred embodiment, the gripping tire has a recess segment with a concave contour on the side directed towards the wheelchair wheel and the axis of the gripping tire; the recess segment preferably has a radius of curvature m of 30 mm≤m≤80 mm. The center point of a circle describing the recess segment is shifted in a direction parallel to the axial division line in the direction of the straight piece vis-a-vis the center point of a circle describing the straight piece. This distance n is preferably 5 mm≤n≤30 mm.

The transition between the recess segment and the neighboring areas of the gripping tire is described by a third connecting circle segment and a fourth connecting circle segment. The third connecting circle segment preferably has a radius k between 5 mm≤k≤30 mm, whereas the fourth connecting circle segment preferably has a radius l between 5 mm≤l≤30 mm.

In the case that the radii k, l and m are equal to zero, the gripping tire will not have a recess segment, but will instead have a completely convex cross-sectional profile.

The recess segment of the gripping tire serves as a recessed grip for the fingers of the wheelchair user when he grabs the gripping tire and ensures that there is a reliable and pleasant hold of the fingers on the gripping tire. The ergonomics and haptics of the gripping tire are further improved with that. In particular, a more uniform distribution of pressure between the hand and the gripping tire is achieved via the adaptation of the profile shape to the hand ergonomics. Individual pressure points are avoided with that, which has a soothing effect and that reduces or prevents carpal tunnel syndrome.

The process as per the invention for determining the value of at least one parameter of the cross-sectional profile of the gripping tire has a step for determining the value of at least one parameter of the hand of a wheelchair user and a step for determining the value of at least one parameter of the cross-sectional profile of the gripping tire from the value that was found for the at least one parameter of the hand of the wheelchair user. This process permits an especially good adaptation of the gripping tire to the respective wheelchair user and therefore further improved ergonomics and haptics of the gripping tire for the respective wheelchair user.

The hand parameter of the wheelchair user here is preferably at least one parameter from the group comprised of the hand length, the hand circumference, the finger length, the finger width, the distance between the index finger and the ball of the thumb and the span between the thumb and index finger of the wheelchair user. The at least one parameter of the hand of the wheelchair user is preferably determined by means of a tape measure, via optical measurement or via measurement by means of thermal or pressure sensors. The magnitudes of all of the above-mentioned parameters will be determined in an especially advantageous process.

With the aid of the value of the at least one hand parameter of the wheelchair user that is found, the value can be determined of at least one parameter of the cross-sectional profile of the gripping tire that is contained in the group comprised of the length a of the long main axis of the ellipse, the length b of the short main axis of the ellipse, the diameter c of the circle of curvature in the vertex of the ellipse, the tilt d of the main axis a vis-a-vis the radius of the gripping tire, the length e of the straight piece of the gripping tire, the radius f of the straight piece, the tilt g of the straight piece vis-a-vis the radial division line, the radius h of the first connecting circle segment, the radius i of the second connecting circle segment, the distance j of the center point of the ellipse from the straight piece, the radius k of the third connecting circle segment, the radius l of the fourth connecting circle segment, the radius m of the recess segment and the distance n of the center point of the circle describing the recess segment from the center point of the circle describing the straight piece in a direction parallel to the axial division line.

The value of the at least one parameter of the cross-sectional profile is preferably determined using a table or one or more characteristic curves. This table or the characteristic curves, as the case may be, are based on test series conducted by the inventors. In the process, test subjects gripped a plastically pliable object similar to a gripping tire and shaped it in accordance with their hand shape. A corresponding cross-sectional profile of the gripping tire was created for each test subject with the aid of this object. The parameters a to n described above were recognized as being sufficient for a geometric description of the profiles in a subsequent simulation of the cross-sectional profiles. In so doing, a correlation resulted between the values of the parameters of the hand of a test subject and the values of the parameters of the cross-sectional profile of the gripping tire suitable for this test subject. The value of the at least one parameter of the cross-sectional profile is preferably determined by a computer or, more precisely, by software installed on a computer.

The values of the parameters of the cross-sectional profile determined in that way are subsequently passed along to software that creates a cross-sectional profile of the gripping tire and makes it available for the production of the gripping tire based on the values that are determined and the average values of the other parameters of the cross-sectional profile for which values have not been conveyed.

The gripping tire preferably has a coating, especially a powder coating or a rubber lining, or is anodized. Better haptics and thermal insulation are advantageously achieved in that way; a cold feeling when this is touched is reduced for the user because of that. Moreover, the visual appearance of the gripping tire can be individualized via the coating.

BRIEF DESCRIPTION OF THE DRAWINGS

Several design examples of the invention will be explained below with the aid of figures. The following are shown in the figures.

DETAILED DESCRIPTION OF THE PREFERRED EMBODIMENT

Figure 1:
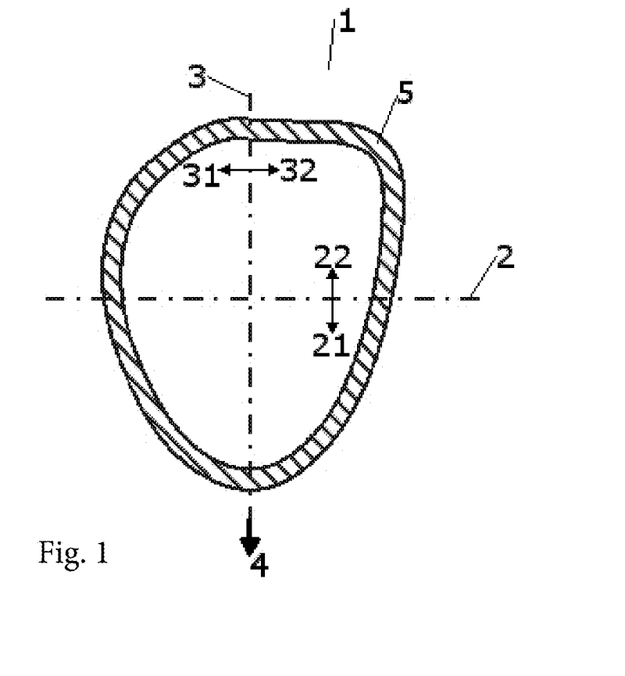
FIG. 1 shows the cross-sectional profile of a gripping tire as per the invention with a completely convex profile pattern.

FIG. 1 shows the cross-sectional profile 1 of a gripping tire for a wheelchair as per the invention; the embodiment that is shown has a completely convex contour. A radial parting line 2 and an axial parting line 3 are drawn into the profile. The axial parting line 3 is parallel to the plane of the wheel to which the gripping tire is mounted, and thus in a vertical direction to a very great extent, in the installed product. The radial dividing line 2 is, accordingly, horizontal to a very great extent. The direction towards the center point 4 of the gripping tire is indicated by an arrow 4 on the axial separation line 3.

The axial parting line 3 divides the cross-sectional profile 1 into a bulbous side 31 and a flattened side 32. Analogously, the radial parting line 2 divides the cross-sectional profile 1 into a bulbous side 21 that represents the inner side turned towards the center point of the gripping tire and a flattened side 22 that is also called the outer side or the side turned away from the center point.

Two areas that are straight to a very great extent meet at an angle of 85° to form a gripping edge 5 in the quadrant of the cross-sectional profile 1 that is on the flattened side 32 of the axial parting line 3 and on the flattened side 22 of the radial parting line 2. This gripping edge 5 is rounded with a radius of 4 mm.

The gripping tire in FIG. 1 is an extruded aluminum profile with a wall thickness of 2 mm.

The cross-sectional profile 1 has (in the area of the axial parting line 3) a radial extension of 24 mm and an axial extension (in the area of the radial parting line 2) of 20 mm.

Figure 2:
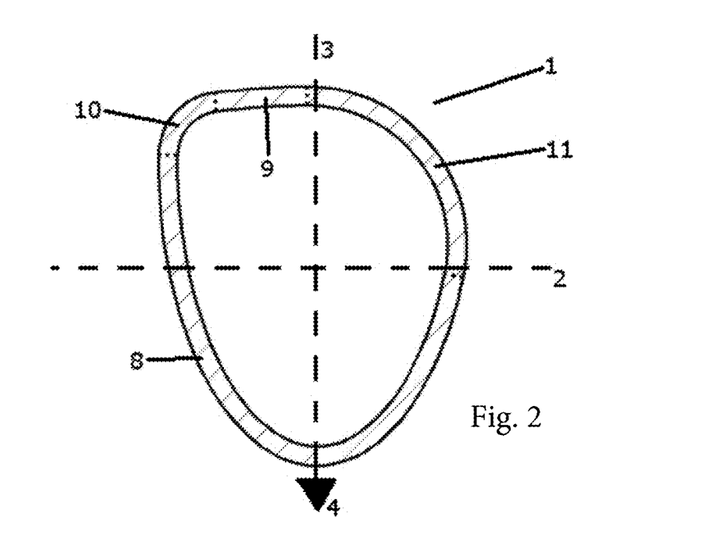
FIG. 2 shows the cross-sectional profile of a gripping tire as per the invention with designations of the segments.

FIG. 2 illustrates the individual segments of the cross-sectional profile 1. An elliptical segment 8 is arranged on the side of the cross-sectional profile 1 turned towards the axis of the gripping tire. A straight piece 9 is opposite the elliptical segment 8. A first connecting circle segment 10 and a second connecting circle segment 11 connect the elliptical segment 8 and the straight piece 9.

Figure 3:
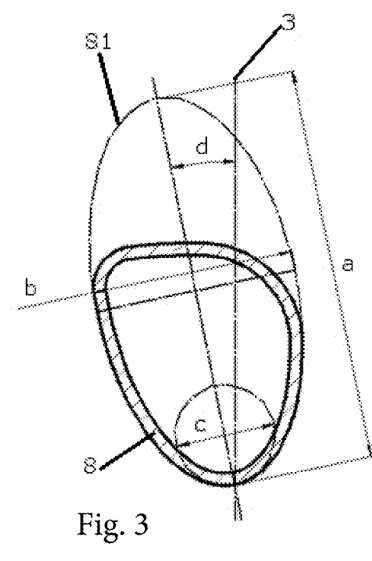
FIG. 3 shows the cross-sectional profile with a drawn-in ellipse.

FIG. 3 illustrates the parameters for describing the elliptical segment 8. The elliptical segment 8 is a section from an ellipse 81. It is described by the parameters a, b, c and d; a designates the total extension of the longer axis of the ellipse, b designates the total extension of the shorter axis of the ellipse, c designates twice (the diameter) the smallest radius of the ellipse 81, which is in the center of the (inner) side turned towards the axis of the gripping tire to a very great extent.

Figure 4:
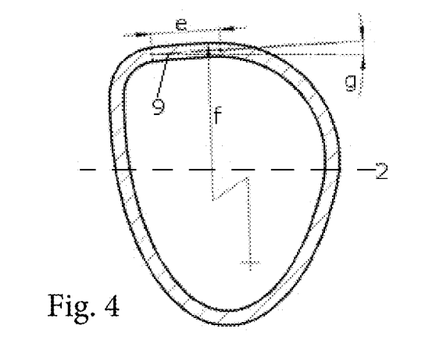
FIG. 4 shows the cross-sectional profile with a drawn-in straight piece.

FIG. 4 illustrates the parameter e, which indicates the length of the straight piece 9. Furthermore, the straight piece is tilted by the angle g vis-a-vis the radial division 2. Moreover, the straight piece does not have to be completely straight, but could also have a radius f.

Figure 5:
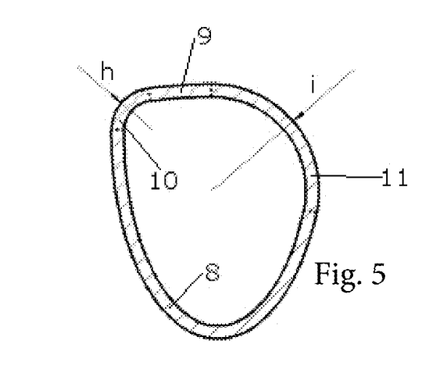
FIG. 5 shows the cross-sectional profile with an elucidation of the radii of the connecting circle segments.

FIG. 5 illustrates the radii h and i of the first or second connecting circle segments 10, 11, respectively.

Figure 6:
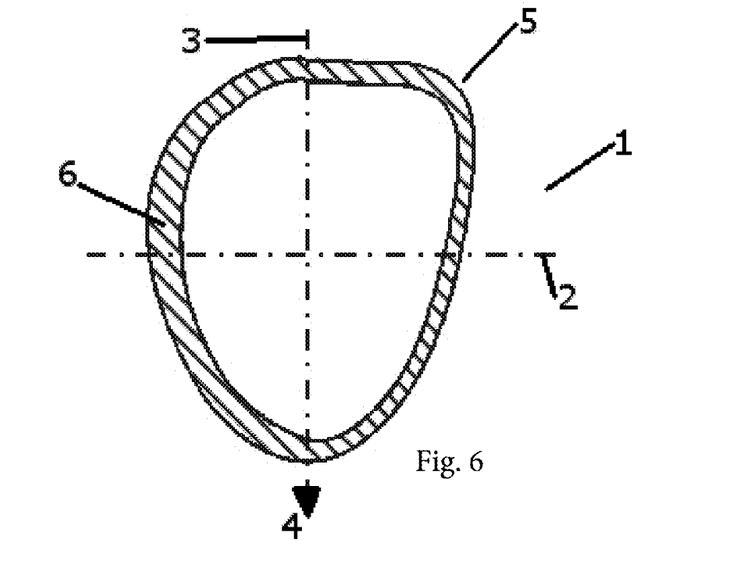
FIG. 6 shows the cross-sectional profile of a gripping tire as per the invention with a varying wall thickness.

FIG. 6 shows the cross-sectional profile 1 of a gripping tire that has a fairly large wall thickness of 3 mm in the area of the bulbous side 31 of the axial parting line 3. The wall thickness on the flattened side 32 of the axial parting line 3 is 1 mm.

Figure 7:
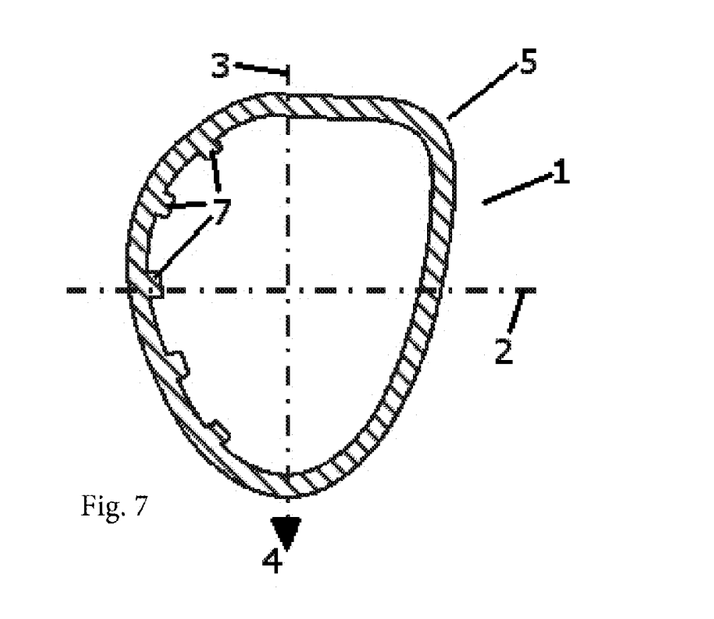
FIG. 7 shows the cross-sectional profile of a gripping tire with reinforcement ribs.

FIG. 7 shows, analogously to FIG. 2, a cross-sectional profile 1 that is reinforced in the area of the bulbous side 31 of the axial parting line 3 in that reinforcement ribs are attached in the interior in the cross-sectional profile 1.

Figure 8:
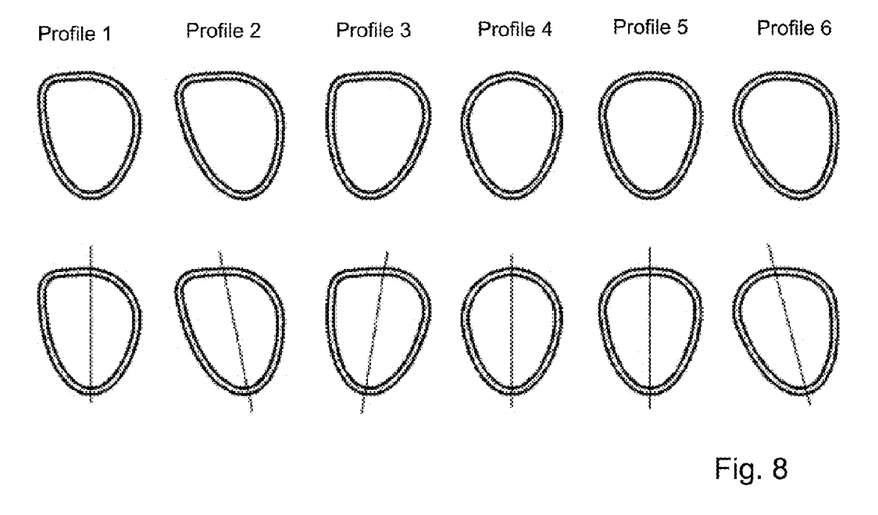
FIG. 8 shows various design examples of the cross-sectional profile.

FIG. 8 shows various preferred cross-sectional profiles with a drawn-in tilt of the long axis of the ellipse a. The parameters of the profiles that are shown have the following values (Table 1):

TABLE 1

| Dimension | Unit | Profile 1 | Profile 2 | Profile 3 | Profile 4 | Profile 5 | Profile 6 |
|---|---|---|---|---|---|---|---|
| a | mm | 40 | 40 | 40 | 40 | 40 | 40 |
| b | mm | 20 | 20 | 20 | 20 | 20 | 20 |
| c | mm | 10 | 10 | 10 | 10 | 10 | 10 |
| d | ° | 0 | 12 | −12 | 0 | 0 | 12 |
| e | mm | 6 | 7 | 8 | 0 | 5 | 6 |
| f | mm | 55 | 55 | 55 | — | 25 | 25 |
| g | ° | 4 | 4 | 4 | — | 0 | −4 |
| h | mm | 4 | 4 | 4 | 10 | 8 | 8 |
| i | mm | 10 | 10 | 8 | 10 | 8 | 8 |

Figure 9:
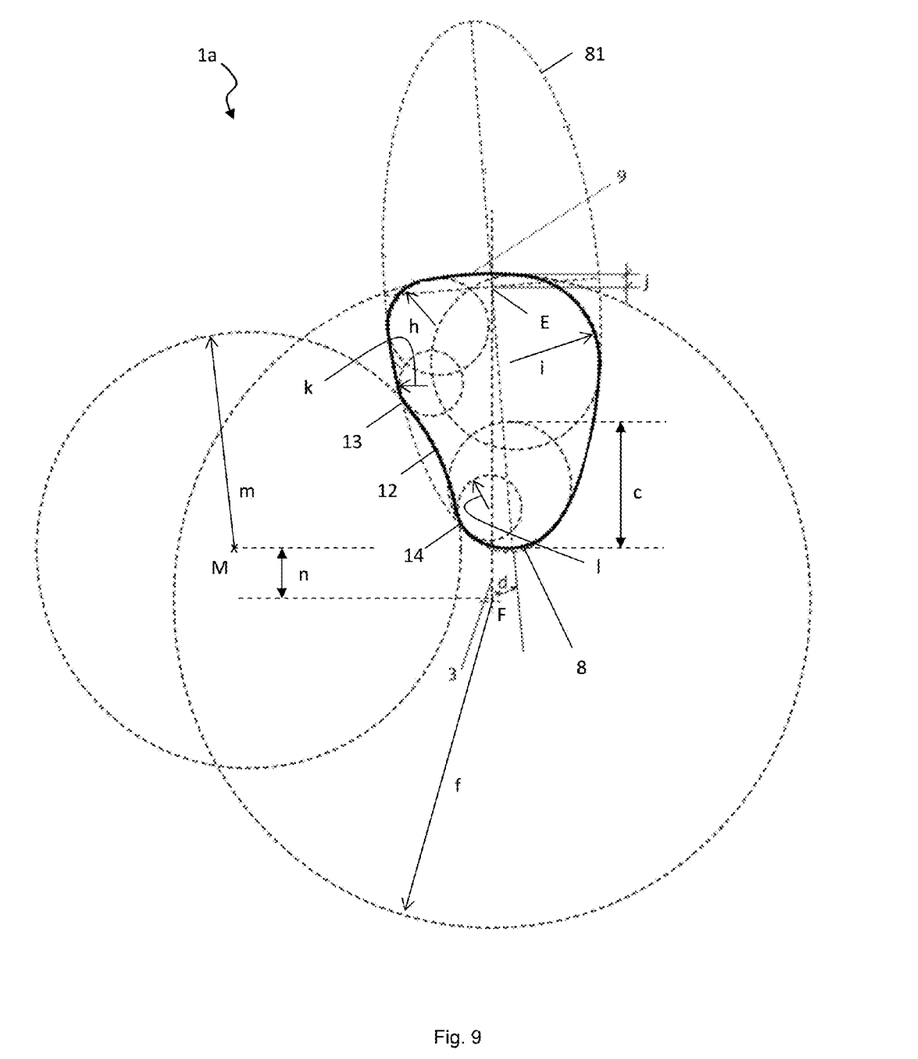
FIG. 9 shows the cross-sectional profile of an embodiment of the gripping tire as per the invention with a recess segment.

FIG. 9 shows the cross-sectional profile 1a of a gripping tire that has a recess segment 12 with a concave contour in the quadrant that is both on the flattened side 32 of the axial parting line 3 and on the bulbous side 21 of the radial parting line 2. The recess segment 12 has a radius of curvature m. The center point M of a circle with the radius m describing the recess segment 12 is shifted by a distance n towards the straight piece 9 in a direction parallel with the axial division line 3 vis-a-vis the center point F of a circle with the radius f describing the straight piece 9. The transition between the recess segment 12 and the neighboring areas of the gripping tire is described by a third connecting circle segment 13 with the radius k and a fourth connecting circle segment 14 with the radius l.

The recess segment 12 is absolutely formed in the side of the gripping tire that is turned towards the wheelchair wheel. The gripping tire is to therefore be mounted on the wheelchair wheel with the flattened side 32 of the axial parting line 3 directed towards the wheelchair wheel in the example shown in FIG. 9. In a different example, the recess segment 12 is formed in the quadrant that is both on the bulbous side 31 of the axial parting line 3 and on the bulbous side 21 of the radial parting line 2, so the gripping tire is to be mounted on the wheelchair wheel with the bulbous side 31 of the axial parting line 3 directed towards the wheelchair wheel.

Furthermore, the distance j between the center point E of the ellipse 81 and the straight piece 9 is shown in FIG. 9. The center point E is on the axial parting line 3 that corresponds to the connecting line between the circumference of the circle and the center point F of the circle with the radius f (the tilt g of the straight piece 9 vis-a-vis the axial division line 2 is ignored).

The cross-sectional profile 1a of the gripping tire can accordingly be described by the following geometric figures:

A circle with the radius f and the center point F, wherein the connecting line between the circumference of the circle and the center point F represents the axial parting line 3;

An ellipse 81 with a long main axis with the length a and a short main axis with the length b, a center point E, a distance j of the center point E to the circumference of the circle with the radius f, wherein the long main axis is tilted by the angle d vis-a-vis the axial parting line 3;

A circle with the diameter c and two tangential contact points to the ellipse 81 in a part of the ellipse 81 turned towards the center point F so that the diameter c roughly corresponds to twice the smallest radius of the ellipse 81;

A straight piece 9 with the length e that is arranged on the circumference of the circle with the radius f, wherein the straight piece 9 is tilted by the angle g vis-a-vis the radial parting line 2;

A circle with the radius h, a tangential contact point with the circle with the radius f and a tangential contact point to the ellipse 81;

A circle with the radius i, a tangential contact point with the circle with the radius f and a tangential contact point to the ellipse 81;

A circle with the radius m and a center point M that is at a distance n from the center point F of the circle with the radius f towards the straight piece 9 in a direction in parallel with the axial division line 3;

A circle with the radius k, a tangential contact point with the circle with the radius m and a tangential contact point to the ellipse 81; and A circle with the radius l, a tangential contact point to the circle with the radius m and a tangential contact point to the circle with the diameter c.

The cross-sectional profile consequently results from the straight piece 9; the respective circle segments lying between the tangential contact points of the circles with the diameter c or the radii h, i, k and l that correspond to the elliptical segment 8 and the first to the fourth connecting circle segments 10, 11, 13 and 14; the circle segment within the ellipse 81 of the circle with the radius m and the sub-segments of the ellipse 81 running between these segments.

The following values apply to the individual parameters or dimensions (Table 2) for the example shown in FIG. 9:

TABLE 2

| | Dimension | | | | | | | | | | | | |
|---|---|---|---|---|---|---|---|---|---|---|---|---|---|
| | a | b | c | d | e | f | g | h | i | j | k | l | m | n |
| Value | 54 | 24 | 8 | 12 | 11.3 | 50 | 4 | 20 | 10 | 5 | 5 | 5 | 25 | 28 |
| Unit | mm | mm | mm | ° | mm | mm | ° | mm | mm | mm | mm | mm | mm | mm |

One or more or all of the values of the parameters of the profile can be determined from values that were found for parameters of the hand of a wheelchair user; the profile of the gripping tire can be individually adapted to the respective wheelchair user or, at the very least, a gripping tire with a suitable profile can be selected from a plurality of available gripping tires because of that. In so doing, the value of a specific profile parameter can be found, for instance, in a characteristic curve corresponding to a value that was found for a specific hand parameter.

Figure 10A:
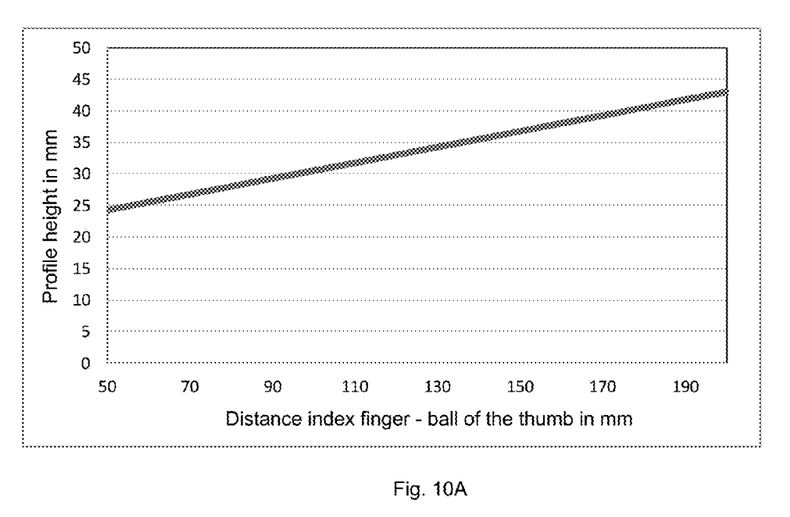
FIG. 10A shows the characteristic curve for the dependence of the profile height on the distance of the index finger to the ball of the thumb.
Figure 10B:
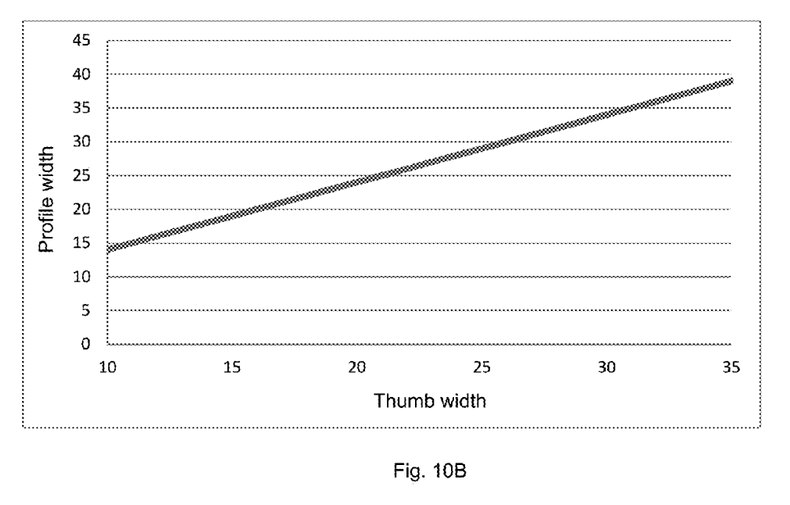
FIG. 10B shows the characteristic curve for the dependence of the profile width on the width of the thumb.

FIGS. 10A and 10B show characteristic curves of that type as examples. The characteristic curve for the dependence of the profile height on the distance of the index finger to the ball of the thumb is shown in FIG. 10A, whereas FIG. 10B shows the characteristic curve for the dependence of the profile width on the width of the thumb. The profile height describes the sum of one-half of the length a of the long main axis of the ellipse (81) and the distance j of the center point (E) of the ellipse (81) from the straight piece (9), whereas the profile width corresponds to the length b of the short main axis of the ellipse (81).

LIST OF REFERENCE NUMERALS 1, 1a Cross-sectional profile
2 Radial parting line
21 Bulbous side of the radial parting line
22 Flattened side of the radial parting line
3 Axial parting line
31 Bulbous side of the axial parting line
32 Flattened side of the axial parting line
4 Direction towards the center point of the gripping tire
5 Gripping edge
6 Reinforced area
7 Reinforcement ribs
8 Elliptical segment
81 Ellipse
9 Straight piece
10 First connecting circle segment
11 Second connecting circle segment
12 Recess segment of the gripping tire
13 Third connecting circle segment
14 Fourth connecting circle segment
a Length of the long main axis of the ellipse
b Length of the short main axis of the ellipse
c Circle diameter
d Tilt of the main axis a vis-a-vis the radius of the gripping tire
e Length of the straight piece
f Radius of the straight piece
g Tilt of the straight piece vis-a-vis the radial division line
h Radius of the first connecting circle segment
i Radius of the second connecting circle segment
j Distance of the center point of the ellipse from the straight piece
k Radius of the third connecting circle segment
l Radius of the fourth connecting circle segment
m Radius of the recess segment
n Distance of the center point of the circle describing the recess segment from the center point of the circle describing the straight piece in a direction in parallel with the axial division line
E Center point of the ellipse
F Center point of the circle with the radius f
M Center point of the circle with the radius m

The invention claimed is:

1. Gripping tire for a wheelchair with an asymmetrical profile cross-section divided up in the radial and axial directions, wherein one of the sides of the axial division and the side of the radial division turned towards the axis of the gripping tire are designed to be bulbous, and the other side of the axial division and the side of the radial division turned away from the axis of the gripping tire are flattened, wherein bulbous and flattened areas smoothly merge into one another, and wherein
the side of the radial division turned towards the axis of the gripping tire is an elliptical segment (8) and the side of the radial division turned away from the axis of the gripping tire has a straight piece (9), wherein the straight piece (9) and the elliptical segment (8) are connected via a first connecting circle segment (10) with a radius h and a second connecting circle segment (11) with a radius i.

2. Gripping tire according to claim 1, characterized in that the gripping tire can be mounted on a wheelchair wheel with either side, and thus with the bulbous side or with the flattened side directed towards the wheelchair wheel.

3. Gripping tire according to claim 1, characterized in that the gripping tire is designed in the form of a hollow profile.

4. Gripping tire according to claim 3, characterized in that the hollow profile has a large wall thickness in the areas facing outwards when assembled.

5. Gripping tire according to claim 3, characterized in that the interior of the profile has reinforcement ribs (7) along the circumference.

6. Gripping tire according to claim 5, characterized in that the reinforcement ribs (7) are only formed in sections, in particular in the area facing outwards in the direction of installation.

7. Gripping tire according to claim 1, characterized in that the radius h has a value of 2 mm≤h≤15 mm and the radius i has a value of 10 mm≤i≤20 mm.

8. Gripping tire according to claim 1, characterized in that the elliptical segment (8) is a segment of an ellipse with main axes a and b, wherein the longer main axis a with the radius of the gripping tire and the shorter main axis b with the axial direction of the gripping tire enclose an angle d with −25°≤d≤+25°.

9. Gripping tire according to claim 8, characterized in that the main axis a has a length of 20 mm≤a≤100 mm and the main axis b has a length of 15 mm≤b≤50 mm.

10. Gripping tire according to claim 9, characterized in that the smallest diameter c of the elliptical segment (8) takes on a value of 5 mm≤c≤25 mm.

11. Gripping tire according to claim 1, characterized in that the straight piece (9) is tilted by an angle g with −15°≤g≤+15° vis-a-vis the radial division and has a straight or slightly convex, curved contour with a radius of curvature f with 30 mm≤f and has a length e with 0 mm≤e≤20 mm, preferably 5 mm≤e≤20 mm.

12. Gripping tire according to claim 1, characterized in that the gripping tire is made of fiber-reinforced plastic or aluminum.

13. Gripping tire according to claim 1, characterized in that the gripping tire has a recess segment (12) with a concave contour that is formed in the side of the gripping tire directed towards the wheelchair wheel and towards the axis of the gripping tire and that has a radius of curvature m of 30 mm≤m≤80 mm.

14. Process for determining the value of at least one parameter of the cross-sectional profile of a gripping tire
for a wheelchair with an asymmetrical profile cross-section divided up in the radial and axial directions, wherein one of the sides of the axial division and the side of the radial division turned towards the axis of the gripping tire are designed to be bulbous, and the other side of the axial division and the side of the radial division turned away from the axis of the gripping tire are flattened, wherein bulbous and flattened areas smoothly merge into one another, characterized by
a step for determining the value of at least one parameter of the hand of a wheelchair user and
a step for determining the value of at least one parameter of the cross-sectional profile of the gripping tire from the value that is found of at least one parameter of the hand of the wheelchair user.

15. Process according to claim 14, characterized in that the parameter of the hand of the wheelchair user is at least one parameter from the group comprised of the hand length, the hand circumference, the finger length, the finger width, the distance of the index finger from the ball of the thumb and the span between the thumb and index finger of the wheelchair user and that the parameter of the cross-sectional profile contains at least one from the group comprised of the length a of the long main axis of the ellipse (81), the length b of the short main axis of the ellipse (81), the diameter c of the circle of curvature in the vertex of the ellipse (81), the tilt d of the main axis a vis-a-vis the radius of the gripping tire, the length e of the straight piece (9) of the gripping tire, the radius f of the straight piece (9), the tilt g of the straight piece (9) vis-a-vis the radial division line (2), the radius h of the first connecting circle segment (10), the radius i of the second connecting circle segment (11), the distance j of the center point (E) of the ellipse (81) from the straight piece (9), the radius k of the third connecting circle segment (13), the radius I of the fourth connecting circle segment (14), the radius m of the recess segment (12) and the distance n of the center point (M) of the circle describing the recess segment (12) from the center point (F) of the circle describing the straight piece (9) in a direction parallel to the axial division line (3).

16. Process according to claim 14, characterized in that the value of the at least one parameter of the hand of the wheelchair user is determined by means of a tape measure or by optical measurement or measurement by means of thermal or pressure sensors.

17. Process according to claim 14, characterized in that the value of the at least one parameter of the cross-sectional profile is determined with the aid of a table or a characteristic curve.

* * * * *